United States Patent [19]
Takayuki et al.

[11] Patent Number: 4,551,509
[45] Date of Patent: Nov. 5, 1985

[54] PROCESS FOR MANUFACTURING HOMOPOLYMERS AND COPOLYMERS OF ETHYLENE

[75] Inventors: Okada Takayuki; Tanaka Hisao, both of Ichihara; Sawara Ken-Ichi, Ibaragi; Konaka Tsutomu, Ichihara, all of Japan

[73] Assignee: Societe Chimique des Charbonnages S.A., Paris la Defense, France

[21] Appl. No.: 518,445

[22] Filed: Jul. 29, 1983

[30] Foreign Application Priority Data

Jul. 29, 1982 [JP] Japan ............................. 57-133139

[51] Int. Cl.⁴ ..................... C08F 2/00; C08G 85/00
[52] U.S. Cl. ................................. 526/68; 526/74; 526/84; 528/494
[58] Field of Search .................. 526/84, 68; 528/494

[56] References Cited

U.S. PATENT DOCUMENTS

| 4,013,622 | 3/1977 | De Juneas et al. | 524/388 |
| 4,105,609 | 8/1978 | Machon et al. | 526/84 X |
| 4,342,853 | 8/1982 | Durand et al. | 526/68 |
| 4,412,025 | 10/1983 | Corwin et al. | 524/243 X |
| 4,419,473 | 12/1983 | Mahaffey, Jr. | 524/104 |

FOREIGN PATENT DOCUMENTS

| 832996 | 4/1960 | United Kingdom | 528/494 |
| 884116 | 12/1961 | United Kingdom | 526/74 |
| 467909 | 5/1975 | U.S.S.R. | 526/84 |

Primary Examiner—Joseph L. Schofer
Assistant Examiner—S. Babajko
Attorney, Agent, or Firm—Finnegan, Henderson, Farabow, Garrett & Dunner

[57] ABSTRACT

A process for producing ethylene polymers or ethylene copolymers comprising the steps of: (a) continuously polymerizing ethylene or ethylene and an α-olefin in a reaction mixture at a pressure of at least 300 kg/cm² and a temperature of at least 130° C. in the presence of a catalyst composed of a compound of a transition metal of groups IVa and VIa of the Periodic Table and an organometallic compound of a metal of groups I to III of the Periodic Table; and (b) adding a polyalkylene glycol to the reaction mixture to deactivate the catalyst.

5 Claims, No Drawings

PROCESS FOR MANUFACTURING HOMOPOLYMERS AND COPOLYMERS OF ETHYLENE

BACKGROUND OF THE INVENTION

This invention relates to a process for producing ethylene polymers or ethylene copolymers at a pressure of at least 300 kg/cm$^2$ and a temperature of at least 130° C. More particularly, the invention relates to a process for continuously polymerizing or copolymerizing ethylene at this pressure and this temperature by the use of an ionic polymerization catalyst such as a Ziegler catalyst. A deactivator for the catalyst is added to the reaction mixture at the completion of the reaction.

As is well known, ethylene polymerization or copolymerization may be typically conducted at a pressure between 300 and 3000 kg/cm$^2$, a temperature between 140° C. and 320° C. and in the presence of an ionic polymerization catalyst such as a Ziegler catalyst. In a typical process, the reaction effluent is successively introduced into two separators, one operating at high and one at low pressure. These separators remove the product polymers from the unreacted gases and are generally operated at respective pressures of 100 to 500 kg/cm$^2$ and 1 to 50 kg/cm$^2$.

This conventional process has several drawbacks. Under typical operating conditions, polymerization of ethylene (or, ethylene and another α-olefin) continues in the high pressure separator due to a small quantity of residual ionic polymerization catalyst discharged from the reactor. Unintended substances such as low molecular weight polymers and waxy matters can be produced. These substances affect the quality of the polymer formed and may cause clogging of pipes in the polymerization system. Also, local hot spots may form when polymerization continues outside the reactor, and thermal decomposition of ethylene can occur at these hot spots.

In order to avoid these drawbacks, U.S. Pat. No. 4,105,609 proposed a high pressure process for continuously producing ethylene polymers using an ionic polymerization catalyst. Near the outlet valve of the reactor of that process, an alkali metal compound or an alkaline earth metal salt of a saturated aliphatic or aromatic carboxylic acid was added to deactivate the active ionic polymerization catalyst discharged from the reactor. The reaction product of the deactivator and the catalyst remains with the polymer in the separator, and the addition of the deactivator does not prevent side reactions which occur in unreacted recycle gases, particularly in gases from the high pressure separator.

SUMMARY OF THE INVENTION

An object of the present invention is to overcome the difficulties of the prior art and to provide a deactivator that prevents both low molecular weight polymer formation and side reactions of the unreacted recycle gases.

Additional objects and advantages of the invention will be set forth in part in the description that follows, and in part will be obvious from the description, or may be learned by practice of the invention. The objects and advantages of the invention may be realized and attained by means of the combinations particularly pointed out in the appended claims.

To achieve the foregoing objects and in accordance with the purpose of the invention, as embodied and broadly described herein, the invention comprises a process for producing ethylene polymers or ethylene copolymers comprising the steps of: (a) continuously polymerizing ethylene or ethylene and an α-olefin in a reaction mixture at a pressure of at least 300 kg/cm$^2$ and a temperature of at least 130° C. in the presence of a catalyst composed of a compound of a transition metal of groups IVa to VIa of the Periodic Table and an organometallic compound of a metal of groups I to III of the Periodic Table; and (b) adding a polyalkylene glycol to the reaction mixture to deactivate the catalyst.

DESCRIPTION OF THE PREFERRED EMBODIMENTS

Reference will now be made to the presently preferred embodiments of the invention.

The ionic polymerization catalyst used in this invention is composed of at least one compound of a transition metal of groups IVa to VIa of the Periodic Table and at least one organometallic compound of a metal of groups I to III of the Periodic Table.

At the completion of the reaction, at least one kind of polyalkylene glycol is added to the reaction mixture in a quantity sufficient to deactivate the ionic polymerization catalyst in this invention. This addition prevents side reactions which occur in the high pressure separator and unreacted recycle gases such as side reactions occurring in the high pressure separator due mainly to residual amounts of both ionic polymerization catalyst components and side reactions occurring in the unreacted recycle gases due mainly to residual amounts of ionic polymerization catalyst made from a metal of groups I to III of the Periodic Table.

Preferred examples of the compound of a transition metal of groups IVa to VIa include π-allyl or benzyl complexes of chromium, zirconium and titanium; di- to tetra-valent titanium compounds; and tri- to penta-valent vanadium compounds. These transition metal compounds may also be used as catalysts supported on carriers containing, for example, magnesium halides or hydroxyhalides, alumina, or silicon compounds. These transition metal compounds may be used in the presence of a complexing agent such as ether, amine, or carboxylic acid. Transition metal compounds suitable for use in the invention may be used singly or in combination.

Organo-aluminum compounds are particularly preferred as the organometallic compound of a metal of groups I to III of the Periodic Table. Trialkylaluminums such as triethylaluminum, tri-n-propylaluminum, tri-n-butylaluminum, and tri-n-hexyl-aluminum; dialkylaluminum monohalides such as diethylaluminum chloride, di-n-propylaluminum chloride, di-n-butylaluminum chloride, and di-n-hexylaluminum chloride; alkylaluminum dihalides such as ethylaluminum dichloride, n-propylaluminum dichloride, n-butylaluminum dichloride, and n-hexylaluminum dichloride; alkylaluminum sesquichlorides such as ethylaluminum sesquichloride, n-propylaluminum sesquichloride, n-butylaluminum sesquichloride, and n-hexylaluminum sesquichloride; and derivatives of alkylsiloxanes may be used singly or in combination as the organo-aluminum compound.

The catalyst in a preferred embodiment may be dissolved in an appropriate inactive solvent such as hexane, heptane, toluene, hydrocarbon oil, or used in a liquid dispersion. The transition metal catalyst of groups IVa to VIa of the Periodic Table and the organometallic compound of groups I to III may be mixed in advance and then injected into the reactor as a mixture or may be separately injected into the reactor from respective pipes and mixed in the reactor.

The reactor used for polymerizing or copolymerizing ethylene is preferably an internal agitation tank type or a tube type. Polymerization is conducted in a single reaction zone but may be done in a plurality of reaction zones separated in a reactor or in a plurality of reactors connected in series or in parallel. When a plurality of reactors are used, they may be in a tank-tank combination or a tank-tube combination. When polymerization is conducted in a plurality of reaction zones or reactors, it is possible to use different temperatures, pressures, and gas compositions in each reaction zone or reactor to produce polymers of different characteristics. Propylene, butene-1, hexene-1, octene-1, and 4-methylpentene-1 are examples of suitable α-olefins for copolymerization with ethylene.

The polyalkylene glycol used in this invention as the deactivator for the catalyst may be a polyethylene glycol, a polypropylene glycol, or a polybutylene glycol, for example. A polyethylene glycol or a polypropylene glycol are particularly preferable. The deactivator is added to a reaction mixture at a certain place in the polymerization apparatus where the desired polymerization or copolymerization of ethylene is thought to be substantially complete. Generally, it is preferable to add the deactivator at a place as close to the outlet of the reactor as possible. The deactivator may be added as is or diluted by an inactive solvent such as aliphatic hydrocarbon, aromatic hydrocarbon, or an alicyclic hydrocarbon. If required, the deactivor may also be added to the recycle gases. If so, it is preferable to use a deactivator having a relatively high molecular weight because such a deactivator is easy to remove from the recycle stream.

The active ionic polymerization catalyst discharged from the reactor can be deactivated by the addition of the deactivator in a molar ratio of 0.4 to 15 and preferably a molar ratio of 0.8 to 10 with respect to the total metal of groups IVa to VIa and groups I to III of the Periodic Table present in the catalyst.

If the deactivator is present in a molar ratio less than 0.4, not enough deactivator is present to prevent all of the side reactions in the high pressure separator and unreacted recycle gases. If the deactivator is present in a ratio higher than 15, the quantity of the deactivator mixed in the high pressure separator increases the low molecular weight components in the product polymer and lowers the quality of the polymer. The deactivator concentration in the recycle gas also becomes high, and removal of the deactivator from the recycle gas becomes difficult. The deactivator may enter the reactor with the recycle gas, and the activity of the ionic polymerization catalyst in the reactor can be reduced.

The molecular weight of the polyalkylene glycol is an important factor in achieving the objects of this invention. The polyalkylene glycol added at the reactor outlet is introduced into the high pressure separator together with the reaction mixture and distributed there into the product polymer side and the unreacted gas side of the separator.

The polyalkylene glycol in the gas side, which inhibits side reactions in the recycle gas line, is collected by a collector comprising a cyclone and filter used either before or after the recycle gas is mixed with fresh reactant gas. If the molecular weight of the polyalkylene glycol is low, then as its quantity increases, particle sizes of polyalkylene glycol mists in the recycle gases become smaller, and these mists cannot be thoroughly collected. Part of the mists are thus introduced back into the reactor together with the gases through the compressor. The activity of the ionic polymerization catalyst in the reactor may then be reduced.

The polyalkylene glycol in the product polymer prevents the formation of low molecular weight components in the polymer and deterioration of polymer quality. If the molecular weight of the polyalkylene glycol is too high, however, the quantity of the polyalkylene glycol distributed into the polymer side in the high pressure separator increases, causing a reduction in the quality of the polymer produced. The inhibition of side reactions in the recycle gases would also be lower and a clogged recycle gas line and an increased quantity of low molecular weight substances to be drained would result. Thermal conduction would also deteriorate. The molecular weight of the polyalkylene glycol, therefore, should be between 300 and 5000 and preferably between 400 and 3000.

The purpose of the following examples is to illustrate some embodiments of the invention. The examples are not intended to restrict the scope of the invention.

EXAMPLE 1

Ethylene was continuously fed into a tank type reactor having a stirrer operating at 1500 rpm. The ethylene was compressed to a pressure of 1500 kg/cm$^2$ by an ultra-high pressure compressor, and the average residence time in the reactor was 60 seconds. A fine catalyst liquid dispersion was continuously supplied to the reactor. The dispersion was obtained by mixing a dispersion of $TiCl_3.1/3AlCl_3$ and triethylaluminum in heptane (prepared so that the atomic ratio of aluminum to titanium was 5), and 1-hexene. 1-hexene was added in a molar ratio of 20 with respect to the aluminum. The mixture was then subjected to prepolymerization at 20° C. Polymerization of ethylene was carried out with this dispersion. The solid catalyst was present as 17 ppm by weight based on ethylene feed. About 15 percent of the ethylene was converted to polyethylene.

The reaction effluent was introduced into the high pressure separator where, after pressure reduction, the polymer and the unreacted gases were separated and the unreacted gases were recycled to be reused after cooling.

A polypropylene glycol having a molecular weight of 1000 was supplied by a pump in a molar ratio of 5 with respect to the total aluminum and titanium in the catalyst, from another conduit facing the catalyst conduit (leading to the autoclave) at the same height and at an angle of 180° to the catalyst conduit. Addition of the polypropylene glycol resulted in a temperature drop inside the autoclave, and continuation of the polymerization reaction became impossible. Finally, formation of the polymer became undetectable. Termination of the polymerization reaction and deactivation of the catalyst were thus confirmed.

EXAMPLE 2

Using the same apparatus and catalyst as in Example 1, ethylene containing 0.5 volume percent hydrogen was continuously polymerized at a pressure of 1500 kg/cm$^2$, a temperature of 250° C. and a residence time of 60 sec. Immediately after the outlet valve of the reactor, a polypropylene glycol having a molecular weight of 500 was added to the reaction mixture in a molar ratio of 3 with respect to the total aluminum and titanium in the catalyst. For comparison, a comparative example where no polypropylene glycol was added was also prepared. The conversion of ethylene to polyethylene was about 19 to 20% in both cases. The solid catalysts comprised 20 ppm by weight based on the ethylene feed.

As shown in Table 1, differences between Example 2 and the Comparative Example include: the temperature at the inlet of the high pressure separator, the temperature in the high pressure separator, the coefficient of thermal conductivity at the cooler for unreacted recycle gases, the quantity drained, the degree of coloring of produced polymer pellets (due to products from mild decomposition of ethylene), and the respective quantities of low and high molecular weight substances in the product polymer. In the Comparative Example, as compared with Example 2 of the present invention, polymerization apparently continued beyond the reactor, and undesirable results were obtained.

robenzene; and (B) triethylaluminum in a molar ratio of 5 with respect to titanium. At the inlet of the high pressure separator, a molten polyethylene glycol having a molecular weight of 4000 was added to the reaction mixture in a molar ratio of 3 with respect to the total aluminum and titanium in the catalyst.

As comparative examples, a polyethylene glycol having a molecular weight of 7000 and no polyethylene glycol were added instead of the polyethylene glycol with a molecular weight of 4000.

The conversion of ethylene to polyethylene was about 18 to 19% in all cases. The solid catalyst was supplied in a quantity of 12 ppm by weight based on ethylene feed. Results are shown in Table 2.

In this invention (Example 3), as compared with Comparative Example 2, polymerization in the high pressure separator was prohibited and side reactions in the recycle ethylene line hardly occurred. The extent of coloring of produced polymer and formation of lower molecular weight substances were low. Further, when the molecular weight of the polyethylene glycol used

TABLE 1

| Item | | Comparative Example | This invention |
|---|---|---|---|
| Polypropylene glycol | | Not added | Added |
| High pressure separator | Temperature of reaction mixture at inlet, °C. | 265 | 250 |
| | Temperature of polymer layer, °C. | 260 | 240 |
| Unreacted recycle ethylene line | Overall coefficient of thermal conductivity of cooler, kcal/°C. hm$^2$ | 150 | 300 |
| | Quantity drained, kg/hr | 3 | 1.5 |
| Quantity of polymer produced per TiCl$_3$.$\frac{1}{3}$AlCl$_3$, kg/kg of catalyst | | 1 × 10$^4$ | 1 × 10$^4$ |
| Coloring of produced polymer pellets | | Black substances due to carbon were detected in part of pellets | Clean |
| Low molecular weight substances in polymer produced,*1 % by weight | | 1.0 | 0.55 |
| MI of polymer produced, g/10 min | | 2.2 | 2.0 |
| Fish eyes in 30μ film | | Present in innumerable number | Not present |

*1 Quantity extracted by n-heptane for 72 hr at room temperature

EXAMPLE 3

Ethylene containing 0.4 volume percent hydrogen was polymerized in an autoclave at a pressure of 1500 kg/cm$^2$, a temperature of 240° C. and a residence time of 60 sec. A catalyst liquid dispersion was prepared by diluting, in heptane, (A) a solid catalyst (containing 3 weight percent titanium) obtained by reacting (a) a solid product obtained by reacting n-butyl-magnesium chloride with silicon tetrachloride in di-n-butyl ether, with (b) a liquid titanium compound obtained by reacting titanium tetrachloride with diethylamine in monochlowas higher, side reactions in the recycle ethylene line as well as the quantity of low molecular weight substances in the product polymer increased.

TABLE 2

| Item | | Comparative Example 1 | Comparative Example 2 | This Invention |
|---|---|---|---|---|
| Polyethylene glycol | | M.w. 7000 | Not Used | M.w. 4000 |
| Temperature of polymer layer in high pressure separator, °C. | | 235 | 250 | 235 |
| Recycle ethylene line | Overall coefficient of thermal conductivity of cooler, kcal/°C. hm$^2$ | 200 | 150 | 300 |
| | Quantity drained, kg/h | 2.0 | 2.7 | 1.2 |
| Quantity of polymer produced per solid catalyst, kg/kg of catalyst | | 1.5 × 10$^4$ | 1.6 × 10$^4$ | 1.5 × 10$^4$ |
| Coloring of produced polymer pellets | | Milky white | Contains brown pellets | Milky white |
| Low molecular weight substances in polymer produced,*1 % by weight | | 1.1 | 1.4 | 0.6 |
| MI of polymer produced, g/10 min | | 7.0 | 7.1 | 7.0 |
| Fish eyes in 30μ film | | Not present | Many | Not present |

*1 Same as in Example 2

EXAMPLE 4

Using the catalyst of Example 3, ethylene containing 30 weight percent butene-1 and 0.6 volume percent hydrogen was copolymerized at a pressure of 1000 kg/cm$^2$, a temperature of 230° C., and a residence time of 70 sec. Just after the outlet valve of the reactor, a polypropylene glycol having a molecular weight of 700 was added to the reaction mixture in a molar ratio of 2 with respect to the total aluminum and titanium in the catalyst.

A polypropylene glycol having a molecular weight of 300 and no polypropylene glycol were added in comparative examples.

The conversion of the monomer to polymer was about 16 to 17% in all cases. The solid catalyst was supplied in a quantity of 10 ppm by weight based on ethylene feed. Results were shown in Table 3.

In Comparative Example 1, side reactions in the unreacted monomer recycle line were prohibited but side reactions in the polymer layer in the high pressure separator were not prohibited effectively, and the quantity of low molecular weight substances in the product polymer increased. In Example 4, both side reactions were prohibited effectively and the effect of this invention is apparent.

presence of a catalyst composed of a compound of a transition metal of groups IVa to VIa of the Periodic Table and an organometallic compound of a metal of groups I to III of the Periodic Table; (b) adding a polyalkylene glycol to said reaction mixture to deactivate said catalyst, the molar ratio of said polyalkylene glycol to the metals of groups IVa to VIa and Groups I to III of the Periodic Table in said catalyst being between 0.4 and 15, and the molecular weight of said polyalkylene glycol being between 300 and 5000; (c) separating product polymer or copolymer from unreacted monomer; and (d) recycling said unreacted monomer to said polymerization step.

2. The process of claim 1, wherein said polyalkylene glycol is selected from the group consisting of polyethylene glycol, polypropylene glycol and polybutylene glycol.

3. The process of claim 1, wherein said polyalkylene glycol is added to said reaction mixture after being

TABLE 3

| Item | | Comparative Example 1 | Comparative Example 2 | This Invention |
| --- | --- | --- | --- | --- |
| Polypropylene glycol | | M.w. 300 | Not Used | M.w. 700 |
| High | Temperature of reaction mixture at inlet, °C. | 235 | 240 | 235 |
| Pressure Separator | Temperature of polymer layer, °C. | 235 | 240 | 230 |
| Unreacted monomer recycle line | Overall coefficient of thermal conductivity of cooler, kcal/C. hm$^2$ | 300 | 150 | 300 |
| | Quantity drained, kg/h | 1.0 | 2.5 | 1.0 |
| Quantity of polymer produced per solid catalyst, kg/kg of catalyst | | $1.5 \times 10^4$ | $1.5 \times 10^4$ | $1.5 \times 10^4$ |
| Coloring of produced polymer pellets | | Milky white | Milky white | Milky white |
| Low molecular weight substances in polymer produced,*1 % by weight | | 1.1 | 1.5 | 0.8 |
| MI of polymer produced | | 3.0 | 3.0 | 3.0 |
| Fish eyes in 30μ film | | Slightly | Slightly | Not present |

*1 Same as in Example 2

It will be obvious to those skilled in the art that various modifications can be made in the process of the invention without departing from the scope or spirit of the invention.

What is claimed is:

1. A process for producing ethylene polymers or ethylene copolymers comprising the steps of: (a) continuously polymerizing ethylene or ethylene and an α-olefin in a reaction mixture at a pressure of at least 300 kg/cm$^2$ and a temperature of at least 130° C. in the diluted by an inactive solvent.

4. The process of claim 3, wherein said inactive solvent is selected from the group consisting of aliphatic hydrocarbons, aromatic hydrocarbons, and alicyclic hydrocarbons.

5. The process of claim 1, wherein the molecular weight of said polyalkylene glycol is between 400 and 3,000.

* * * * *